United States Patent
Mhapsekar et al.

(10) Patent No.: US 11,576,109 B2
(45) Date of Patent: Feb. 7, 2023

(54) MODIFYING CAPACITY ASSIGNED TO SUPPORT A NETWORK SLICE ALLOCATED TO A USER DEVICE IN A 5G OR OTHER NEXT GENERATION WIRELESS NETWORK

(71) Applicant: AT&T Intellectual Property I, L.P., Atlanta, GA (US)

(72) Inventors: Rakesh Shankar Mhapsekar, Middletown, NJ (US); Rakesh Bisaria, Freehold, NJ (US); Shen-Neng Chiou, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 163 days.

(21) Appl. No.: 16/804,472

(22) Filed: Feb. 28, 2020

(65) Prior Publication Data

US 2021/0274433 A1    Sep. 2, 2021

(51) Int. Cl.
*H04W 48/16* (2009.01)
*H04W 24/08* (2009.01)
(Continued)

(52) U.S. Cl.
CPC ......... *H04W 48/16* (2013.01); *H04L 41/0896* (2013.01); *H04L 41/16* (2013.01);
(Continued)

(58) Field of Classification Search
None
See application file for complete search history.

(56) References Cited

U.S. PATENT DOCUMENTS 10,411,964 B2 *  9/2019 Zhang ................ H04L 41/0806
10,505,616 B1 * 12/2019 Chen .................... H04B 7/0632
(Continued)

OTHER PUBLICATIONS

U.S. Appl. No. 62/857,021, filed Jun. 4, 2019, Qiao et al., "Handover for Asymmetric Services".*
(Continued)

*Primary Examiner* — Gregory B Sefcheck
(74) *Attorney, Agent, or Firm* — Amin, Turocy & Watson, LLP

(57) ABSTRACT

The technologies described herein are generally directed to facilitating the allocation, scheduling, and management of network slice resources. According some embodiments, a system can comprise a processor and a memory that can store executable instructions that, when executed by the processor, facilitate performance of operations. The operations can include identifying a slice configuration of a network slice that was allocated to a user device, the slice configuration being based on a characteristic of the user device, wherein a capacity of a resource of a network device of a network was previously assigned to support the network slice based on the slice configuration. The operations can further include monitoring usage of the network slice by the user device during the usage of the network slice, resulting in monitored usage of the network slice. Further, based on and during the monitored usage of the network slice, operations can include facilitating modifying the capacity of the resource assigned to support the network slice.

20 Claims, 10 Drawing Sheets

(51) Int. Cl.
*H04L 41/16* (2022.01)
*H04W 28/20* (2009.01)
*H04W 48/18* (2009.01)
*H04L 41/0896* (2022.01)
*H04W 28/02* (2009.01)

(52) U.S. Cl.
CPC ....... *H04W 24/08* (2013.01); *H04W 28/0268* (2013.01); *H04W 28/20* (2013.01); *H04W 48/18* (2013.01)

(56) References Cited

U.S. PATENT DOCUMENTS

| | | | | |
|---|---|---|---|---|
| 10,608,895 | B2* | 3/2020 | Shaw | H04L 41/5003 |
| 10,965,558 | B2* | 3/2021 | Jayakumar | H04L 41/14 |
| 10,986,010 | B2* | 4/2021 | Kodaypak | H04L 47/801 |
| 11,115,292 | B2* | 9/2021 | Kidd | H04L 41/5022 |
| 11,140,037 | B2* | 10/2021 | Lu | H04L 41/0836 |
| 11,160,125 | B2* | 10/2021 | Qiao | H04W 40/246 |
| 11,310,104 | B2* | 4/2022 | Stockert | H04W 16/10 |
| 2019/0123963 | A1* | 4/2019 | Tang | H04W 48/18 |
| 2020/0260334 | A1* | 8/2020 | Gangakhedkar | H04L 41/5009 |
| 2020/0382386 | A1* | 12/2020 | Narendra | H04L 41/5009 |
| 2021/0084525 | A1* | 3/2021 | Takano | H04W 88/18 |
| 2021/0352554 | A1* | 11/2021 | Barac | H04W 36/06 |
| 2021/0400448 | A1* | 12/2021 | Adjakple | H04W 4/40 |

OTHER PUBLICATIONS

U.S. Appl. No. 62/843,767, filed May 6, 2019, Qiao et al., "Network Slicing for Asymmetric Services".*

Stockert, et al. "Management of Persistsent Network Slices By a Distributed Learning System in a 5G or Other Next Generation Wireless Network" U.S. Appl. No. 16/700,055, filed Dec. 2, 2019, 51 pages.

Stockert, et al, "Application Management of Network Slices With Ledgers" U.S. Appl. No. 16/519,633, filed Jul. 23, 2019, 51 pages.

Bisaria, et al. "Recalibrating Resource Profiles for Network Slices in a 5G or Other Next Generation Wireless Network" U.S. Appl. No. 16/804,392, filed Feb. 28, 2020, 46 pages.

* cited by examiner

MODIFYING CAPACITY ASSIGNED TO SUPPORT A NETWORK SLICE ALLOCATED TO A USER DEVICE IN A 5G OR OTHER NEXT GENERATION WIRELESS NETWORK

TECHNICAL FIELD

The subject application is related to management of network slices by a distributed learning system in a 5G or other next generation wireless communication system, and, for example, assigning capacity for slices in a wireless network.

BACKGROUND

Fifth generation (5G) wireless communications can facilitate the abstraction of network services into network slices managed by the provider of the network. Considering the broad variety of devices that rely upon wireless communication, there is the potential for millions or billions of 5G network slices to be allocated to different types of devices. Given the scale and complexity of network slice utilization, allocating, maintaining, and managing network slices can be difficult.

One benefit that can result from the use of network slices is the allocation of network resources to support different types of network applications, e.g., high bandwidth, low-latency, and IoT. Problems that can occur however, can comprise, when allocations are exceeded by the use of a network slice for an application that depending on the resources.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
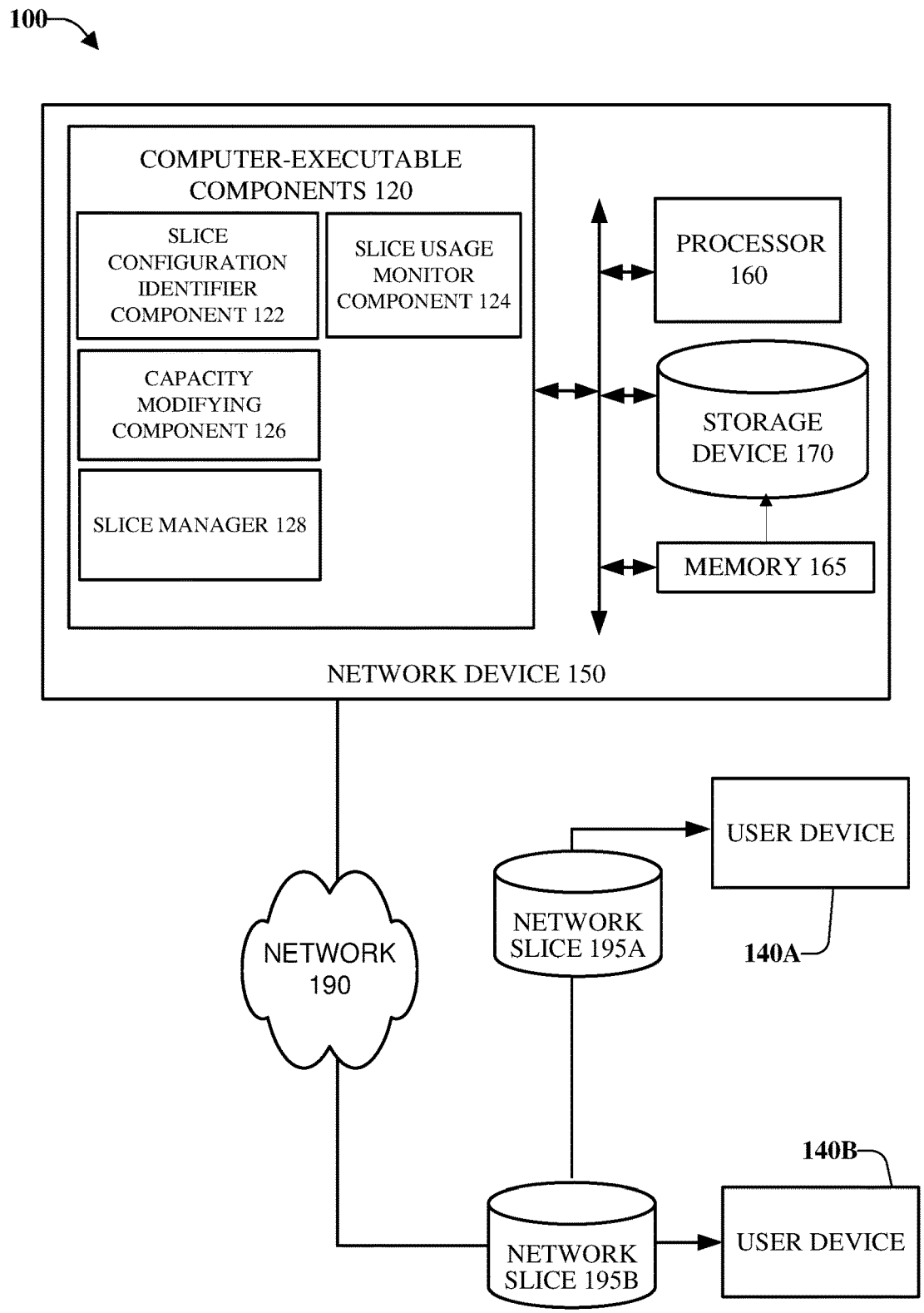
FIG. 1 is an architecture diagram of an example system that can facilitate modifying capacity assigned to support a network slice allocated to a user device, in accordance with one or more embodiments.

Generally speaking, one or more embodiments described herein can facilitate modifying capacity assigned to support network slices allocated to a user devices, using different approaches. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g. long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS).

In some embodiments the non-limiting term user equipment (UE) is used. This term can refer to any type of wireless device that can communicate with a radio network node in a cellular or mobile communication system.

Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g. LTE.

Generally speaking, in one or more embodiments, a network device can provide network slicing with elements to support different types of services and requirements. The network slicing can also be termed virtual networking, and can provide virtual components that can distribute functionality for facilitating services to devices across the network, e.g., supporting multiple virtual networks behind interfaces of a communication network. The slicing of the network into multiple virtual networks can provide support for different Radio Access Networks (RAN) and different service types running across a single RAN. As discussed below, in one or more embodiments, flexible distribution of the access, edge, and core elements of the network cloud can provide support for latency and service isolation for different apps and service requirements.

When providing network slices to user devices, one or more embodiments can assign capacity to support the reliable operation of network slices. As discussed further with FIG. 4 below, capacity for different resources can be assigned at different parts of system 100, e.g., backhaul resource capacity, resources of edge network devices, and base station resources. In some implementations, this capacity represents an excess of resources available to provide to network slices. In some implementations, slices can be allocated to user devices based on different factors, comprising, but not limited to, uses to which the slice is to be utilized, characteristics of the user device, total availability of resources. As is discussed further below, with FIG. 3, capacity profiles can be used as models of capacity assigning for different activities. Further, as discussed with FIGS. 3-6 below, one or more embodiments can modify the operation of user devices, and modify assigned capacity for slices allocated to these devices, based on the monitoring.

Based at least on the characteristics described below, one or more embodiments can cause beneficial results that comprise, but are not limited to, replacing a reactive model with a predictive model of capacity assigning, reducing mean time to repair for aspects of a RAN, provide an approach that is self-updating based on ongoing results, improve responses to network problems, and other similar benefits.

FIG. 1 is an architecture diagram of an example system 100 that can facilitate modifying capacity assigned to support a network slice allocated to a user device, in accordance with one or more embodiments. For purposes of brevity, description of like elements and/or processes employed in other embodiments is omitted.

System 100 can comprise network device 150 communicatively coupled to user devices 140A-B via network 190. Network slices 195A-B are allocated to user devices 140A-B. According to multiple embodiments, network device 150 can comprise memory 165 that can store one or more computer and/or machine readable, writable, and/or executable components 120 and/or instructions that, when executed by processor 160, can facilitate performance of operations defined by the executable component(s) and/or instruction(s).

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

For example, memory 165 can store computer and/or machine readable, writable, and/or executable components 120 and/or instructions that, when executed by processor 160, can facilitate execution of the various functions described herein relating to network device 150, e.g., slice configuration identifier component 122, slice monitor usage component 124, capacity modifying component 126, slice manager 128, as well as other components to implement and provide functions to support system 100.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

In one or more embodiments of network device 150, central slice manager 128 can allocate network slices 195A-B to user devices 140A-B, respectively. To enable the assigning of resources to network slices 195A-B depicted in FIG. 1, using different approaches described below, one or more embodiments of central slice manager can facilitate setting initial configurations of resources for network slices 195A-B.

In one or more embodiments, memory 165 can store executable instructions that, when executed by processor 160, facilitate generation of slice configuration identifier component 122. In one or more embodiments, slice configuration identifier component 122 can perform operations that comprise identifying slice configurations of network slices 195A-B that allocated by slice manager 128 to user devices 140A-B respectively. In one or more embodiments, the slice configurations can be based on characteristics of user devices 140A-B, wherein a capacity of a resource of network device 150 of network 190 was previously assigned to support network slice 195A-B based on the slice configuration.

In one or more embodiments, memory 165 can further store executable instructions that, when executed by processor 160, facilitate generation of slice usage monitor component 124. In one or more embodiments, slice usage monitor component 124 can perform operations that comprise monitoring usage of the network slice by the user device during the usage of the network slice, resulting in monitored usage of network slices 195A-B.

In one or more embodiments, memory 165 can additionally store executable instructions that, when executed by processor 160, facilitate generation of capacity monitoring component 126. In one or more embodiments, capacity monitoring component 126 can perform operations that comprise, based on and during the monitored usage of network slices 195A-B, facilitating modifying the capacity of the resource assigned to support network slice 195A-B.

Figure 2:
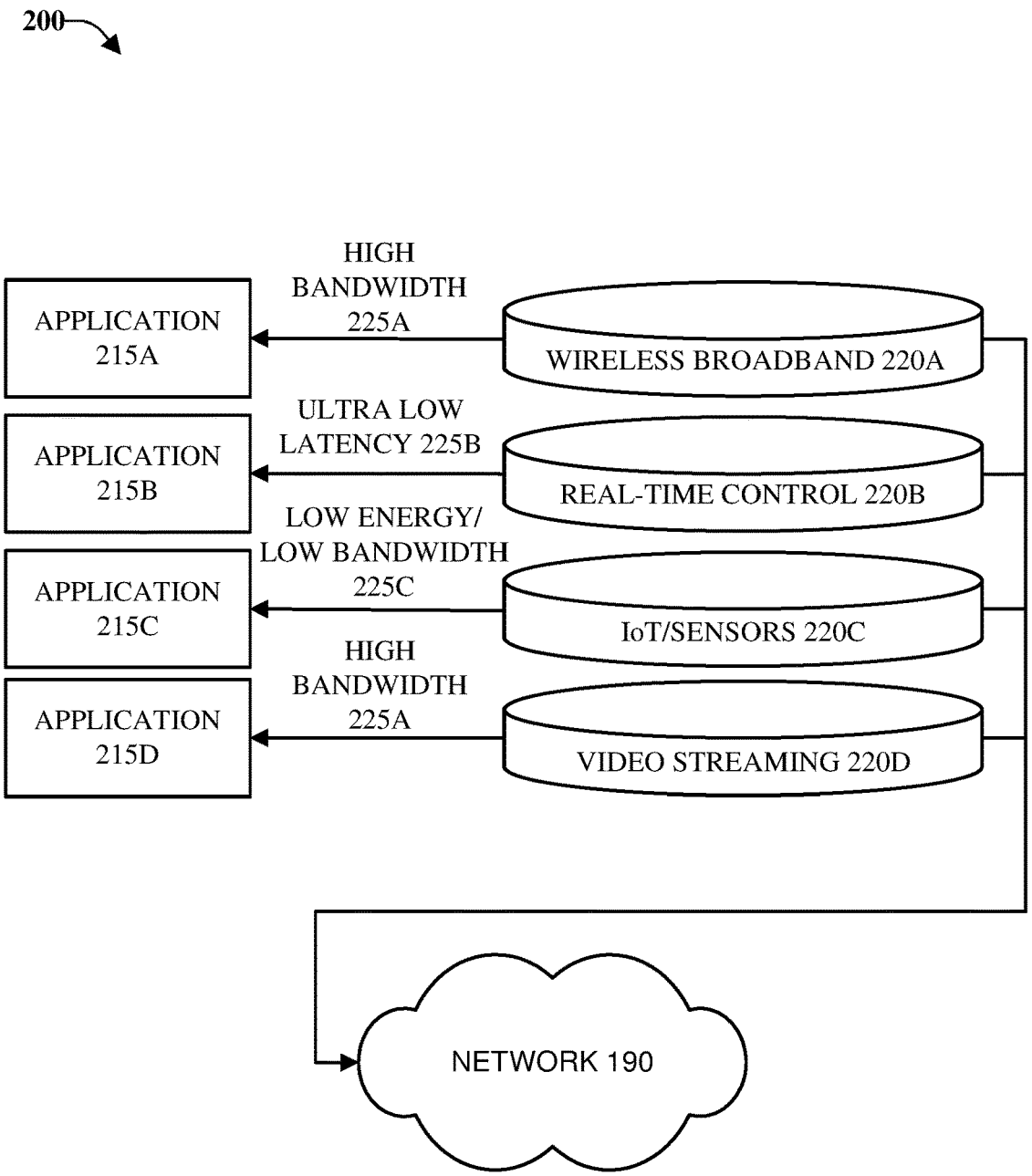
FIG. 2 illustrates an example system of network slices allocated to user devices, in accordance with one or more embodiments.

FIG. 2 illustrates an example system 200 of network slices 220A-D allocated to applications 215A-D one user devices, in accordance with one or more embodiments. For purposes of brevity, description of like elements and/or processes employed in other embodimentsis omitted.

In one or more embodiments, network slices can describe virtual networks with independent sets of logical network functions that can be selected to support particular requirements of different network applications of user devices 215A-D. Resources allocated to network slices can be assigned based on approaches comprising, but not limited to, characteristics of the user device. Further, applications, as a part of execution, can request allocation of a network slice having certain characteristics to facilitate successful program execution. Example characteristics of network slices can comprise, but are not limited to, location, speed, connectivity, latency, security, energy use, coverage, and capacity. Example, network slices 220A-D, configured with certain characteristics for certain applications, are discussed below. As described further with FIG. 3, one approach to assigning capacity for network slices 220A-D is to use slice capacity profiles to group resource values to provide the resources and network topology for the specific service and traffic required by applications 215A-D, these applications using resources of respective network slices. Different characteristics noted above, and throughout the present disclosure, can be allocated to meet the particular demands of each use case.

In an example, application 215A can require high-bandwidth 225A to facilitate wireless broadband network slice 220A. An example of application 215A can be a web browser that requires wireless broadband network slice 220A to deliver web content. In another example, application 215D can require a high bandwidth 225A to facilitate high-quality mobile video streaming 220D. An example slice capacity profile that can provide aspects of these settings is the enhanced mobile broadband (eMBB) slice profile that can provide significantly faster data speeds and greater capacity for connectivity.

In another example, application 215B can require ultra-low latency 225B to facilitate real-time control 220B. As discussed further in examples below, in an example, application 215B can utilize real-time control 220B to control a flying drone, or provide support for devices that enable remote medical care, procedures, and treatment. An example slice capacity profile that can provide aspects of these settings is the ultra-reliable low-latency communications (uRLLC) slice profile.

In another example, application 215C can utilize a low energy/low bandwidth 225C to facilitate efficient control of IoT sensors 220C. Specific approaches described further herein can also facilitate developing 5G IoT capabilities to discover and adhere to slice-defined limitations. An example slice capacity profile that can provide aspects of these settings is the massive machine to machine communications (mMTC) slice profile.

One having skill in the relevant art(s), given the description herein, will appreciate that the above descriptions of applications and slice profiles that can utilize one or more embodiments is non-limiting, and other applications can be allocated combinations of resource characteristics to support different functions.

In one or more embodiments, capacity monitoring component 126 can perform operations that comprise, based on and during the monitored usage of network slices 195A-B, facilitating modifying the capacity of the resource assigned to support network slice 195A-B in accordance with a guideline for assigning the capacity of the resource of the network, e.g., slice profiles 225A-C. Further, capacity monitoring component 126 can facilitate modifying the capacity of the resource assigned to support network slice 195A-B in accordance with a service level agreement.

Figure 3:
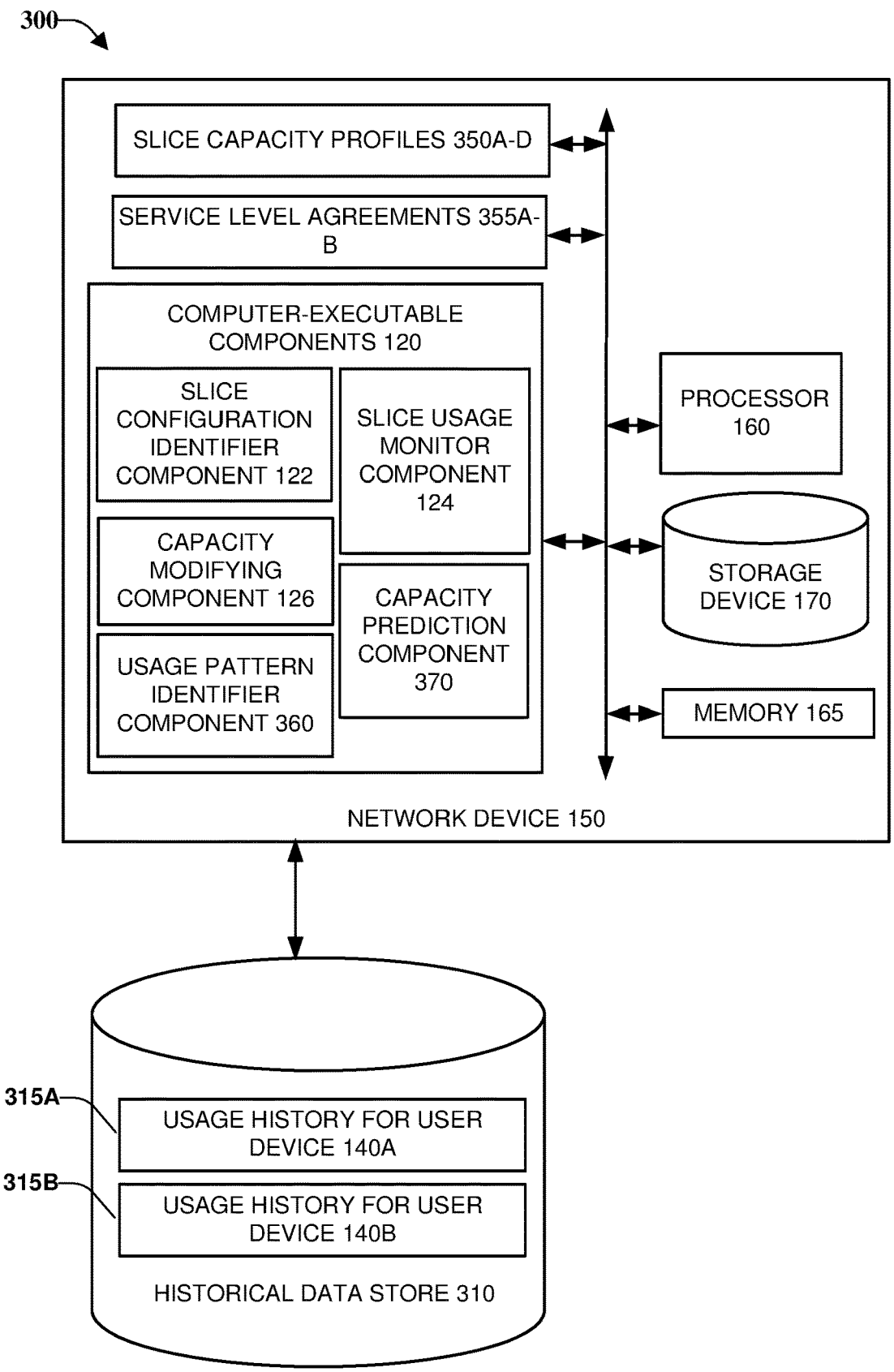
FIG. 3 illustrates a system that can use a network device to facilitate modifying capacity assigned to support network slices based on historical utilization data, in accordance with one or more embodiments.

FIG. 3 illustrates a system 300 that can use network device 370 to facilitate modifying capacity assigned to support network slices based on historical utilization data, in accordance with one or more embodiments. For purposes of brevity, description of like elements and/or processes employed in other embodiments is omitted.

System 300 can comprise network device 150 communicatively coupled to historical data store 310. As depicted in FIG. 3, network device 150 can further comprise slice capacity profiles 350A-C, and service level agreements 355A-B. As depicted, computer-executable components 120 can further comprise usage pattern identifier 360 and capacity prediction component 360.

In one or more embodiments, the modifying the capacity of the resource by capacity modifying component 126 can be further based on historical information associated with the network device of the network comprised in a data store. As used herein, data associated with the network device can be broadly interpreted, comprising, but not limited to, usage data of user device 140A, for which the capacity was initially set, usage data for an example user device 140B, a device similar to user device 140A, e.g., having the same characteristics, being used in a similar fashion, being used by same type of user, e.g., users that have similar tasks to perform with user devices 140A-B, such as a first responder, or an IoT device. Thus, in one or more embodiments, the historical information utilized by capacity modifying component 126 can comprise historical information regarding usage of user devices determined to be similar to the user device based on a defined similarity criterion.

Additional factors that can affect changes to the capacity assigned to a network slice is a service level agreement for the slice, often to set guidelines for maintaining the levels of service specified by the profiles 225A-C. For example, from the discussion of FIG. 2, with application 215A requiring high-bandwidth 225A (e.g., eMBB profile) to facilitate wireless broadband network slice 220A for a high bandwidth 225A application to facilitate video streaming can use SLA 355A to establish guidelines to maintain an excess capacity for the bandwidth resource of the network slice.

Usage data, as used to describe some embodiments herein, can broadly comprise, but is not limited to, bandwidth utilization by slices allocated to monitored devices and other utilization measures that can affect predictions as to future utilization of the network slice, these predictions being discussed further with FIG. 6 below. In one or more embodiments, historical information utilized by capacity modifying component 126 can comprise historical information regarding usage of the user device. In one or more embodiments, approaches to data collection and analysis can result in predictions (e.g., projections) that can used to modify capacity assigning for network slices before any service degradation for the network slice occurs.

In one or more embodiments, memory 165 can store executable instructions that, when executed by processor 160, facilitate generation of usage pattern identifier component 360. In one or more embodiments, usage pattern identifier component 360 can perform operations that comprise identifying a pattern of usage of user device 140A based on and during the monitored usage, resulting in an identified pattern of usage, and wherein the historical information associated with the network can comprise historical information regarding user devices with patterns of usage similar to the identified pattern of usage.

Figure 4:
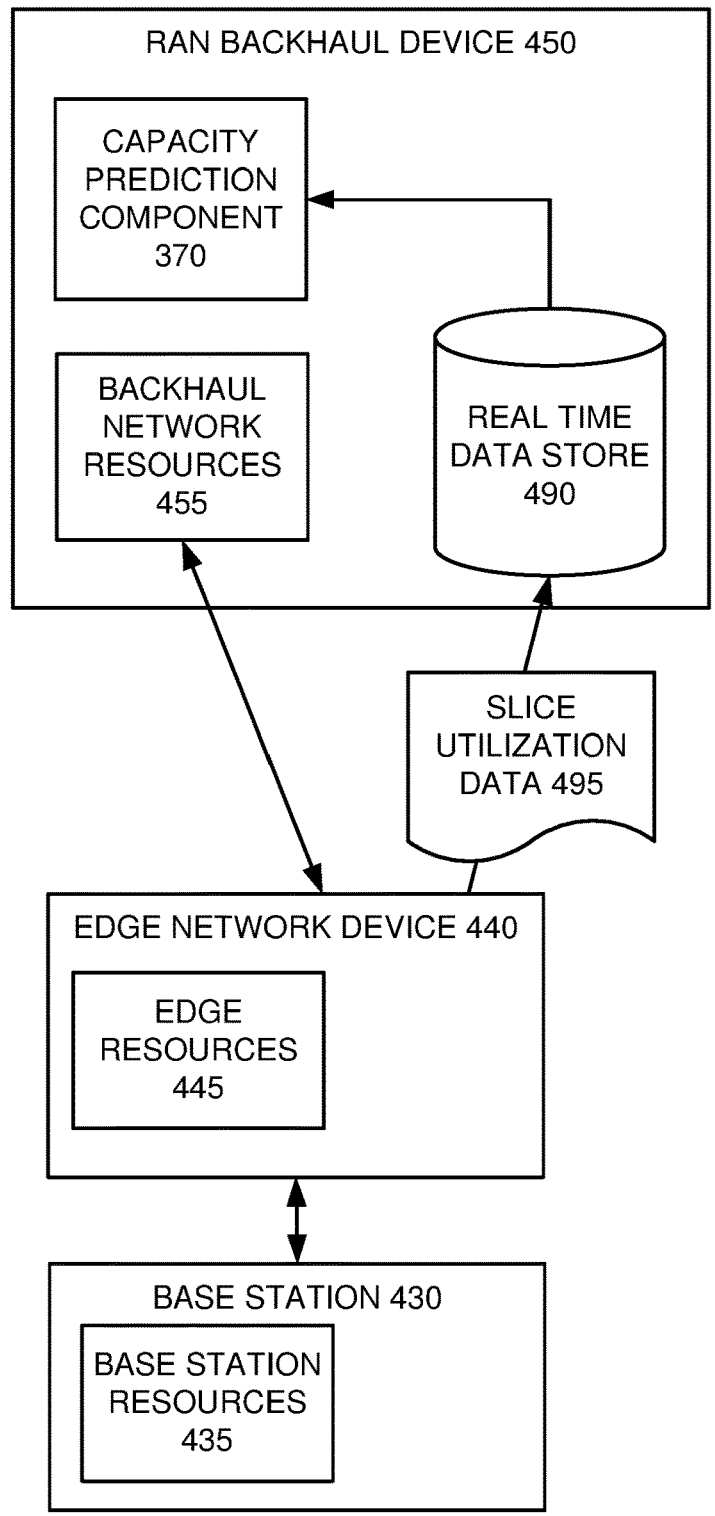
FIG. 4 depicts a diagram that illustrates an example system that can facilitate modifying capacity assigned to support network slices based on slice utilization data, in accordance with one or more embodiments.

FIG. 4 depicts a diagram that illustrates an example system 400 that can facilitate modifying capacity assigned to support network slices based on slice utilization data 495, in accordance with one or more embodiments. For purposes of brevity, description of like elements and/or processes employed in other embodiments is omitted. System 400 can comprise base station 430, edge network device 440, and RAN backhaul device 450. Base station 430 comprises base station resources 435 and edge network device 440 comprises edge resources 445. In one or more embodiments, base station can receive signals from RAN backhaul device 450 via edge network device 440 and can serve the connectivity to multiple user devices 140A-B in a RAN. RAN backhaul device 450 comprises capacity prediction component 370, real time data store 490, and backhaul network resources 455, in accordance with one or more embodiments. It should be noted that the elements of network device 150 can be used at one or more levels of RAN 400, e.g., to advantageously distribute and replicate the monitoring of slice utilization data 495, evaluation of usage data (e.g., by capacity prediction component analyzing real time data store 490, and modifying capacity assigning of resources based on usage data, for the different levels.

As illustrated in FIG. 4, one or more embodiments can change assigning at multiple levels of a RAN, with each level having resources available, e.g., for services provided to slice allocated to user device 140A either the services provided or underlying resources of the services. For example, user device 140A can be allocated network slice 195A with the ultra-low latency 225B profile specifying the assigning of resources to facilitate real-time control 220B of a flying drone, or remote medical care devices. In an example implementation, ultra-low latency 225B profile can specify the assigning of resources for multiple layers of RAN 400, e.g., wireless bandwidth at base station 430, at edge network device 440, resources to facilitate low-latency handoff to another base station, and at RAN backhaul device, resources to facilitate low-latency handoff to another edge network device, as well as other backhaul resources.

Figure 5:
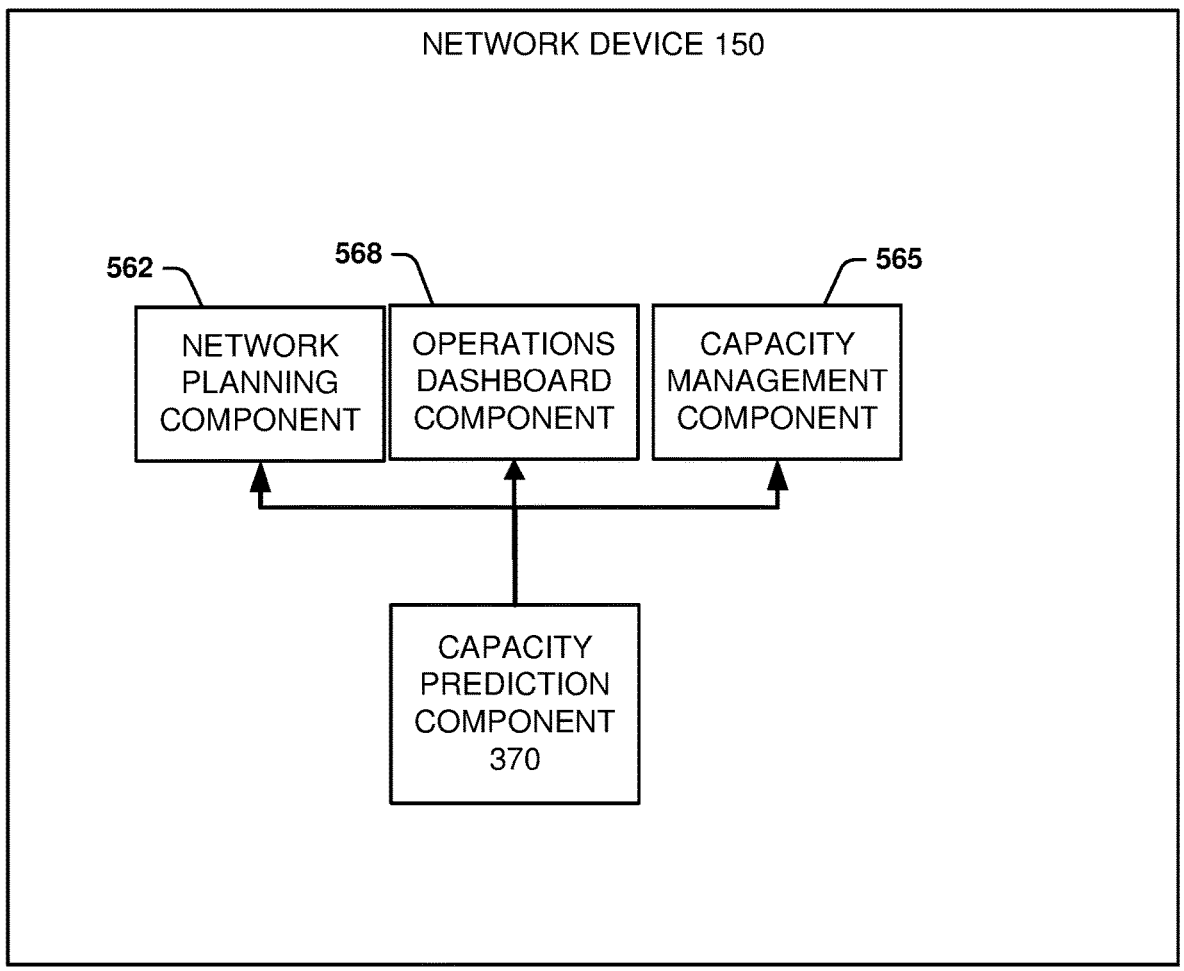
FIG. 5 depicts a non-limiting, example system that can facilitate modifying capacity assigned to support network slices based on historical utilization data, in accordance with one or more embodiments.

FIG. 5 depicts a non-limiting, example system 500 that can facilitate modifying capacity assigned to support network slices based on historical utilization data, in accordance with one or more embodiments. System 500 can comprise another view of network device 450, which can comprise capacity prediction component 370 providing information to network planning component 562, operations dashboard component 568, and capacity management component 565.

In one or more embodiments, network planning component 562, operations dashboard component 568, and capacity management component 565 can be interfaces that can provide different predictive planning functions from those described for capacity management component 126 (e.g., in some embodiments facilitating automatic and dynamic changes to capacity assigning). In example implementations, network planning component 562 can utilize predictions from capacity prediction component 370 for longer-term planning of network resource allocations, operations dashboard component 568 can provide a visual display of aggregated capacity assigning for network components, and capacity management component 565 can provide the capacity for user input into capacity modifications that can also be performed by capacity modifying component 126.

Figure 6:
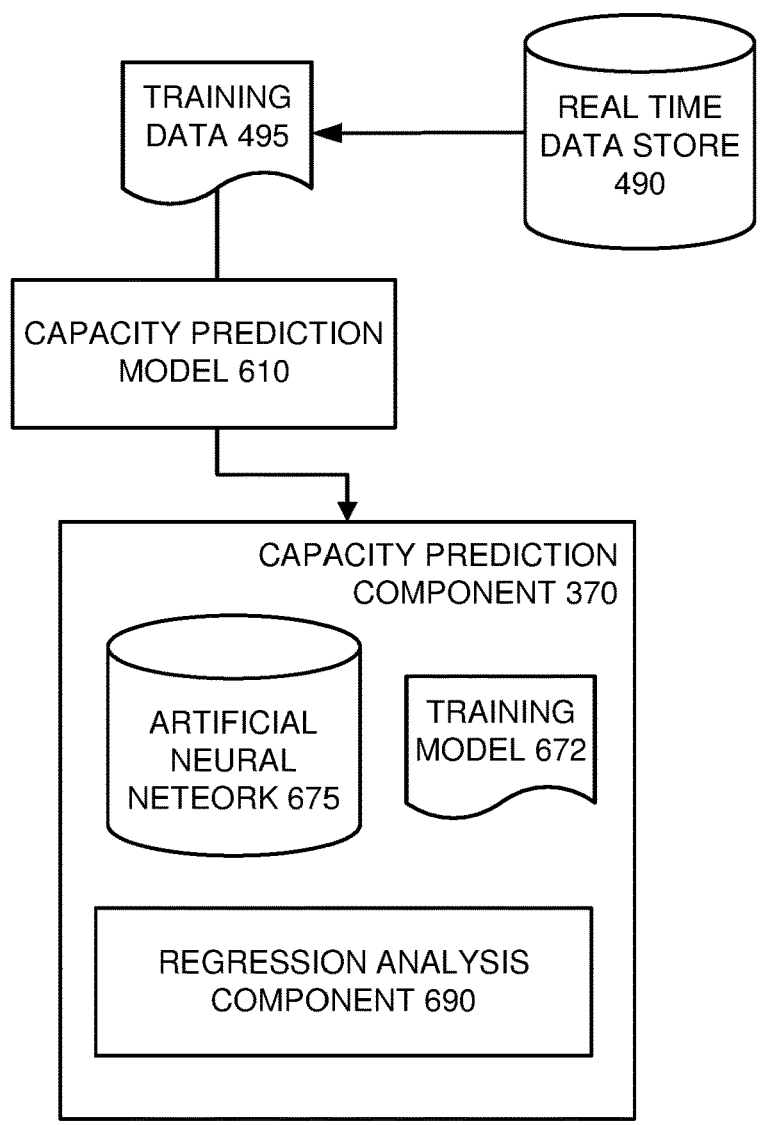
FIG. 6 illustrates an implementation of an example, non-limiting system that can facilitate modifying capacity assigned to support network slices based on historical utilization data by employing artificial intelligence and machine learning in combination or individually, by approaches comprising those described by examples below.

FIG. 6 illustrates an implementation of an example, non-limiting system 600 that can facilitate modifying capacity assigned to support network slices based on historical utilization data by employing artificial intelligence and machine learning in combination or individually, by approaches comprising those described by examples below. Repetitive description of like elements and/or processes employed in respective embodiments is omitted for sake of brevity.

As depicted, system 600 can comprise capacity prediction component 370, real-time data store 490, training data 495, and capacity prediction model 610. Capacity prediction component 370 in this example can comprise artificial neural network (ANN) 675, ANN training model, and regression analysis component 690.

In certain embodiments, different functions of capacity prediction component 370 can be facilitated based on classifications, correlations, inferences and/or expressions associated with principles of artificial intelligence and machine learning. For example, capacity prediction component 370 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, and ensemble ML algorithms/methods, comprising deep neural networks (DNN), reinforcement learning (RL), Bayesian Statistics, long short-term memory (LSTM) networks. One or more of the above approaches can be specified in capacity prediction model 610 can be used by capacity prediction component 370 to analyze one or more sources of network usage information discussed above. In an approach that can be used by some embodiments described herein, the impact of different parameters on the overall working of the slice can be modeled, and specific conditions can be identified under which the slice performance can slow down or users can experience performance degradation.

In an example embodiment, the historical data store 310 can be comprised in information stored in ANN 675, that was trained by historical information associated with the network device 150. In additional embodiments, initial and subsequent training of ANN 675 can be based on collected production data stored in real-time data store 490 that has been divided into training data 495 in a first data portion and optimizing data (e.g., testing, validation) in a second portion of data. In different approaches, these portions can be selected based on different approaches that comprise, but are not limited to, a random or pseudorandom selection process.

As would be appreciated by one having skill in the relevant art(s), given the description herein, different aspects of network data records (e.g., utilization data of user devices 140A-B) can be used to train ANN 675. Example values that can be assessed comprise, bandwidth utilization, quality of service metrics such as key performance indicators (KPIs) and key quality indicators (KQI), performance and configuration data collected by UE/eNodeB, along with different scenarios of traffic utilization e.g., peak utilization, minimal utilization, and average utilization of network interfaces. As would be appreciated by one having skill in the relevant art(s), given the description herein, after training by the first portion of data, the second portion of data, analysis results for the data, can be used to validate and update ANN 675, if needed. It should be noted that this description of employing an ANN is non-limiting, e.g., one or more embodiments can use other types of artificial intelligence and machine learning algorithms that receive input and perform capacity analysis as described above.

In another approach, machine learning (supervised learning) based solutions to analyze the types of data described above to generate predicted need for capacity assigning modifications for network slices. As would be appreciated by one having skill in the relevant art(s), given the description herein, regression analysis component 690 can be used to apply a regression analysis approach to machine learning for embodiments, e.g., this approach being useful in some circumstances for analyzing data to generate different optimal solutions to a problem.

Figure 7:
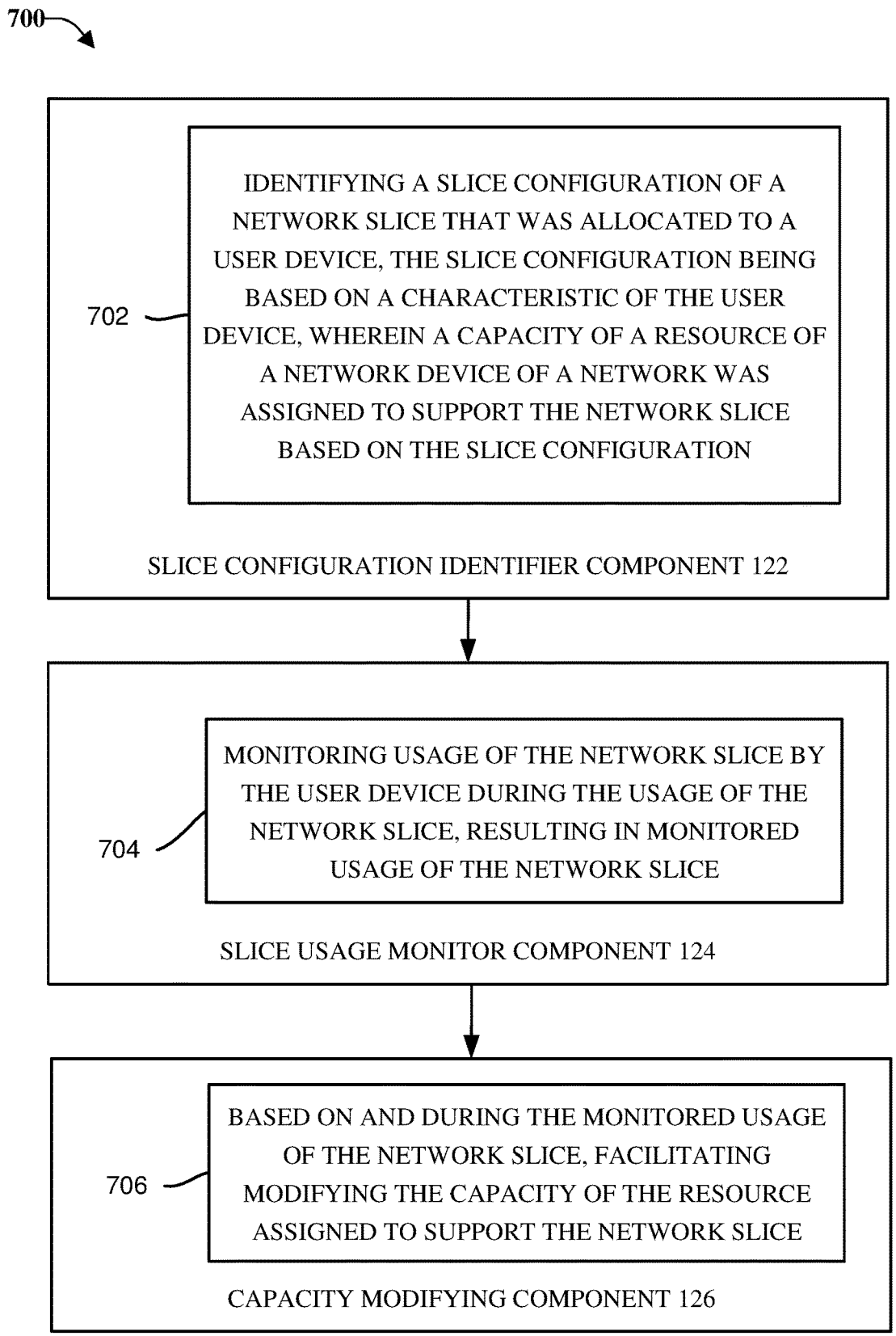
FIG. 7 illustrates an implementation of an example, non-limiting system that can facilitate modifying capacity assigned to support network slices based on historical utilization data that can comprise slice a configuration identifier component, slice monitor usage component 124, and capacity modifying component, in accordance with one or more embodiments, in accordance with one or more embodiments described herein.

FIG. 7 illustrates an implementation of an example, non-limiting system 700 that can facilitate modifying capacity assigned to support network slices based on historical utilization data that can comprise slice configuration identifier component 122, slice monitor usage component 124, and capacity modifying component 126, in accordance with one or more embodiments, in accordance with one or more embodiments described herein. Repetitive description of like elements and/or processes employed in respective embodiments is omitted for sake of brevity.

Slice configuration identifier component 122 can be configured 702 to facilitate in one or more embodiments identifying a slice configuration of a network slice that was allocated to a user device, the slice configuration being based on a characteristic of the user device, with capacity of a resource of a network device of a network being assigned to support the network slice based on the slice configuration. For example, in one or more embodiments, slice configuration identifier component 122 can be configured 702 to facilitate identifying a slice configuration of network slice 195A that was allocated to user device 140A, the slice configuration being based on a characteristic of the user device, with capacity of a resource of a network device of a network being assigned to support the network slice based on the slice configuration, e.g., latency and bandwidth capacity can be assigned for network slice 195A based on ultra-low latency 225B profile.

Slice monitor usage component 124 can be configured 704 to facilitate in one or more embodiments monitoring usage of the network slice by the user device during the usage of the network slice, resulting in monitored usage of the network slice. For example, in one or more embodiments, slice monitor usage component 124 can be configured 704 to facilitate monitoring usage of the network slice 195A by user device 140A during the usage of the network slice, resulting in monitored usage of the network slice. In an example, based on the use of application 215B, user device 140A has been utilizing a large amount of low-latency bandwidth with network slice 195A.

Capacity modifying component 126 can be configured 706 to facilitate in one or more embodiments, based on and during the monitored usage of the network slice, modifying the capacity of the resource assigned to support the network slice. For example, in one or more embodiments, capacity modifying component 126 can be configured 706 to facilitate, based on and during the monitored utilizing a large amount of low-latency bandwidth of network slice 195A, modifying the capacity of bandwidth assigned to support the network slice, e.g., avoiding problems with exceeding the originally assigned bandwidth capacity.

Figure 8:
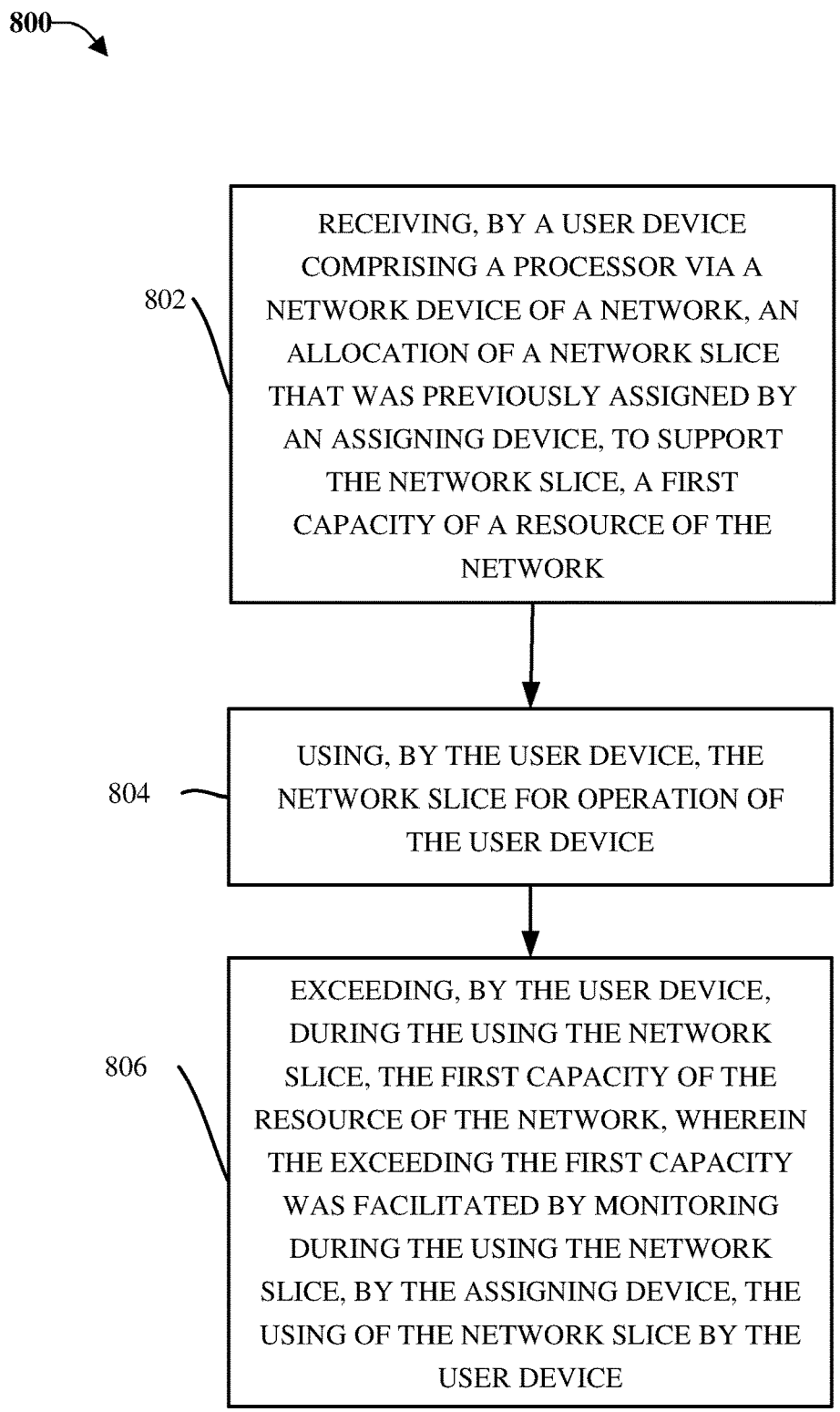
FIG. 8 illustrates a flow diagram of an example method that can facilitate the allocation, scheduling, and management of network slice resources, in accordance with one or more embodiments.

FIG. 8 illustrates a flow diagram of an example method 800 that can facilitate the allocation, scheduling, and management of network slice resources, in accordance with one or more embodiments. For purposes of brevity, description of like elements and/or processes employed in other embodiments is omitted.

At 802, method 800 can comprise receiving, by a user device comprising a processor via a network device of a network, an allocation of a network slice that was previously assigned, by an assigning device, to support the network slice, a first capacity of a resource of the network. For example, in one or more embodiments, method 800 can comprise receiving, by user device 140A comprising a processor via a network device 150 of network 190, an allocation of network slice 195A that was previously assigned by a network device 150, to support network slice 195A, a first capacity of bandwidth of the network.

At 804, method 800 can comprise using, by the user device, the network slice for operation of the user device. For example, in one or more embodiments, method 800 can comprise using, by user device 140A, network slice 195A for operation of the user device.

At 806, method 800 can comprise exceeding, by the user device, during the using the network slice, the first capacity of the resource of the network, wherein the exceeding the first capacity was enabled for the user device prior to the exceeding based on a result of monitoring, by the assigning device, the using of the network slice by the user device. For example, in one or more embodiments, method 800 can comprise exceeding, by user device 140A, during the using network slice 195A, the first capacity of the bandwidth resources of the network, wherein the exceeding the first capacity was enabled for the user device prior to the exceeding based on a result of monitoring, by network device 150, the using of network slice 195A by the user device. One example reason that user device 140A was able to exceed the originally assigned bandwidth capacity for network slice 195A is because monitoring by network device 150 (e.g., by slice usage monitoring component 124) was used to predict the need to exceed the capacity, and the first capacity was modified (e.g., by capacity modifying component 126) to be a larger, second capacity.

It is to be appreciated that one or more embodiments described herein can utilize various combinations of electrical components, mechanical components, mass storage, circuitry, and extensive, repetitive, rapidly performed, and complicated analysis of data that cannot be replicated in the mind of a human or performed by any number of humans working together. One or more embodiments can provide a technical solution to a technical problem by processing and analyzing utilization data of network slices with functions beyond the capability of a human mind, e.g., the operations of network components comprising, but not limited to, slice usage monitor component 124 and capacity modifying component 126 cannot be performed by a human mind in the period of time required by one or more embodiments.

According to several embodiments, system 100 can also be fully operational towards performing one or more other functions (e.g., fully powered on, fully executed, etc.) while also performing the various operations of a RAN that are described and suggested herein. It should be appreciated that such simultaneous multi-operational execution is beyond the capability of a human mind. It should also be appreciated that system 100 can obtain, analyze, and process information that is impossible to obtain, analyze, and process manually by an entity, such as a human user. For example, the type, amount, and/or variety of information included in system 100 disclosed herein, can be more complex than information able to be obtained manually by a human user.

Figure 9:
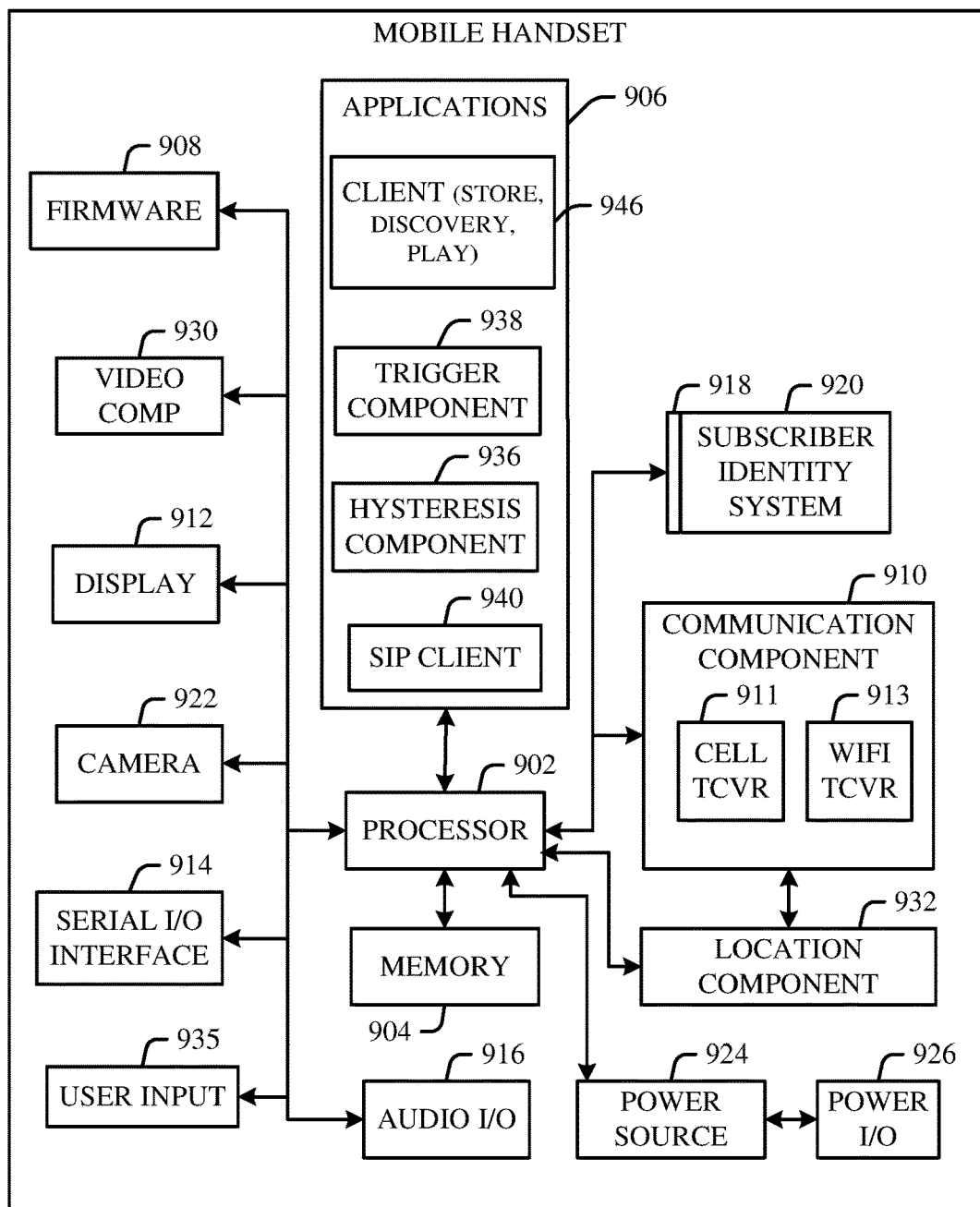
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can comprise routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically comprise a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can comprise volatile and/or non-volatile media, removable and/or non-removable media implemented in any method or technology for storage of information, such as computer-readable instructions, data structures, program modules, or other data. Computer storage media can comprise, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be comprised within the scope of computer-readable media The handset comprises a processor 902 for controlling and processing all onboard operations and functions. A memory 904 interfaces to the processor 902 for storage of data and one or more applications 906 (e.g., a video player software, user feedback component software, etc.). Other applications can comprise voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also comprise a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can comprise a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can comprise a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also comprises a power source 924 in the form of batteries and/or an AC power subsystem, which power source 924 can interface to an external power system or charging equipment (not shown) by a power I/O component 926.

The handset 900 can also comprise a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can comprise such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also comprise a client 942 that provides at least the capability of discovery, play and store of multimedia content, for example, music.

The handset 900, as indicated above related to the communications component 910, comprises an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As discussed with FIG. 1, network 190 can comprise a wireless communication system, and thus can comprise one or more communication service provider networks that facilitate providing wireless communication services to various user equipments included in the one or more communication service provider networks. The one or more communication service provider networks can comprise various types of disparate networks, comprising but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or comprise a large scale wireless communication network that spans various geographic areas. According to this implementation, the one or more communication service provider networks can be or comprise the wireless communication network and/or various additional devices and components of the wireless communication network (e.g., additional network devices and cell, additional user equipments, network server devices, etc.).

The network device 150 can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

Network 190 can employ various cellular systems, technologies, and modulation schemes to facilitate wireless radio communications between devices (e.g., user devices 140A-B and network device 150). While example embodiments comprise use of 5G new radio (NR) systems, one or more embodiments discussed herein can be applicable to any radio access technology (RAT) or multi-RAT system, comprising where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the user devices 140A-B and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
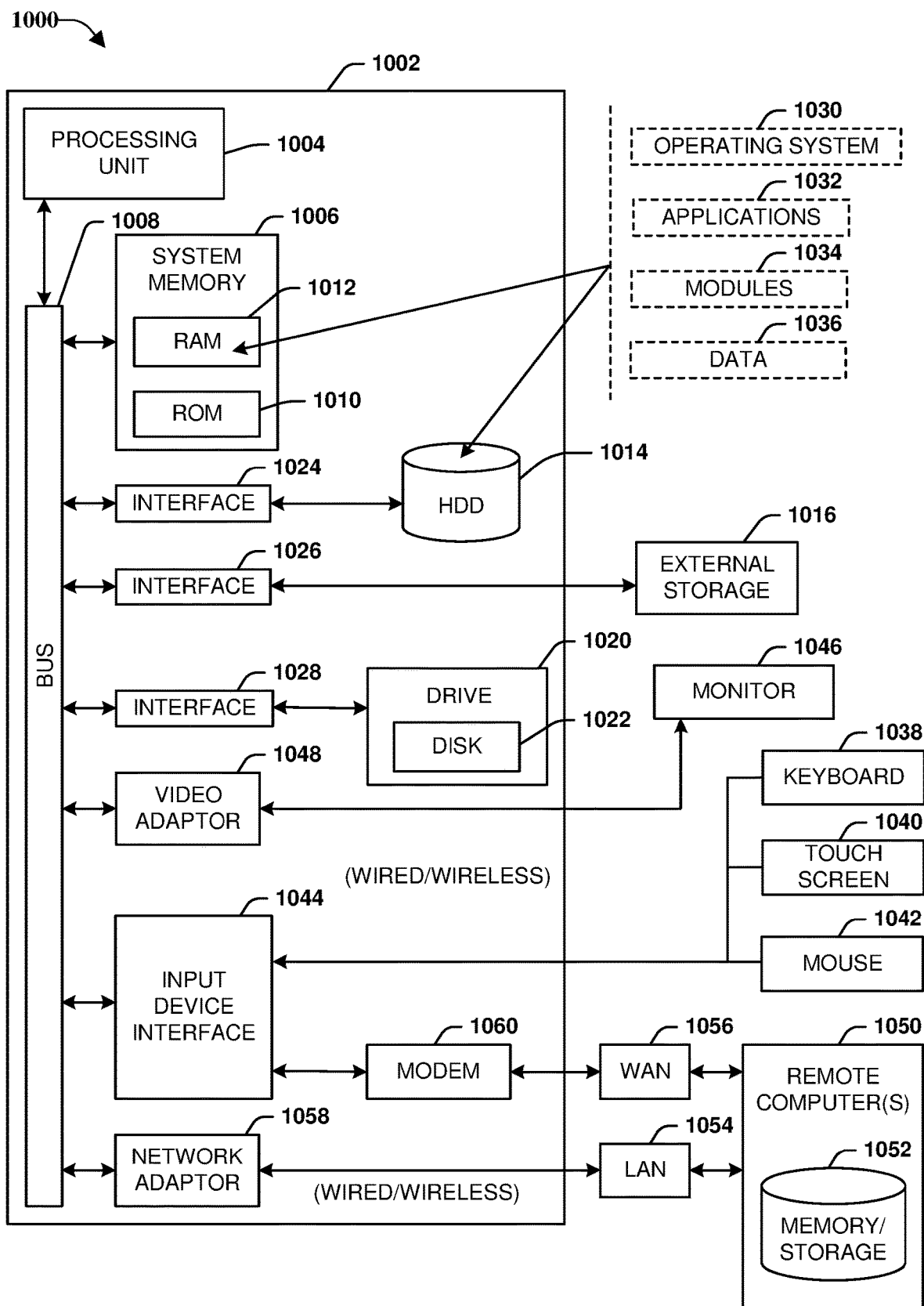
FIG. 10 illustrates an example block diagram of an example computer operable to engage in a system architecture that can facilitate processes described herein, in accordance with one or more embodiments.

In order to provide additional context for various embodiments described herein, FIG. 10 and the following discussion are intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A device, comprising:
  a processor; and
  a memory that stores executable instructions that, when executed by the processor, facilitate performance of operations, comprising:
    analyzing a resource of a network device that is part of a network, assigned to support a network slice, resulting in a discovered slice configuration applicable to the network slice, wherein the discovered slice configuration was allocated to a user device based on a characteristic of the user device and a network service to be used by the user device using the discovered slice configuration, wherein a capacity of the resource was previously assigned to support the network slice based on the discovered slice configuration, and wherein the resource comprises a backhaul link to an edge network resource that supports operation of the network slice;
    based on the discovered slice configuration, monitoring usage of the backhaul link by the network slice based on activity of the user device during the usage of the network slice, resulting in monitored usage of the network slice;
    based on the monitored usage, identifying a change in the capacity of the resource to maintain support of the network service at a threshold quality of service, resulting in an identified change; and
    based on the identified change, modifying the capacity of the resource assigned to support the network slice.

2. The device of claim 1, wherein the operations further comprise, based on and during the monitored usage of the network slice, predicting a future required capacity of the resource to support the network slice, and wherein facilitating the modifying the capacity of the resource assigned to support the network slice is further based on the future required capacity of the resource.

3. The device of claim 1, wherein modifying the capacity of the resource is further based on historical information associated with the network device of the network comprised in a data store.

4. The device of claim 3, wherein the historical information associated with the network comprises historical information regarding usage of the user device.

5. The device of claim 3, wherein the historical information associated with the network comprises historical information regarding usage of user devices determined to be similar to the user device based on a defined similarity criterion.

6. The device of claim 3, wherein the operations further comprise, identifying a pattern of usage of the user device based on and during the monitored usage, resulting in an identified pattern of usage, and wherein the historical information associated with the network comprises historical information regarding user devices with patterns of usage determined to be similar to the identified pattern of usage.

7. The device of claim 3, wherein the data store comprises an artificial neural network of historical information associated with the network device.

8. The device of claim 7, wherein the artificial neural network was generated based on a process comprising:
   training the artificial neural network based on a first portion of historical information associated with the network device; and
   optimizing the artificial neural network based on a second portion of historical information associated with the network device.

9. The device of claim 1, wherein the discovered slice configuration comprises a service level agreement specifying a guideline for the capacity of the resource to be assigned to support the network slice.

10. The device of claim 1, wherein the discovered slice configuration was further based on an enhanced mobile broadband network profile.

11. The device of claim 1, wherein the discovered slice configuration was further based on an ultra-reliable low latency communications profile.

12. The device of claim 1, wherein the discovered slice configuration was further based on a massive machine to machine communications profile.

13. A method, comprising:
   receiving, by a user device comprising a processor via a network device of a network, an allocation of a network slice that was previously assigned, by an assigning device, a first capacity of a resource of the network to support the network slice providing a network service to be used by the user device, wherein the network slice was selected for allocation based on a slice configuration discovered by the assigning device, resulting in a discovered configuration;
   using, by the user device, the network slice for operation of the user device; and
   exceeding, by the user device during the using the network slice, the first capacity of the resource of the network, wherein exceeding the first capacity was enabled during the using of the network slice for the user device prior to the exceeding, based on monitoring, by the assigning device using the discovered configuration, providing the network service to the user device wherein the assigning device monitors a first backhaul connection that provides the network service to an edge device supporting the network slice, and wherein exceeding the first capacity was enabled based on switching the first backhaul connection to a second backhaul connection that is different than the first backhaul connection.

14. The method of claim 13, wherein exceeding the first capacity was enabled for the user device prior to the exceeding based on the first capacity of the resource of the network having been modified to a second capacity of the resource of the network as the result of the monitoring, and wherein the second capacity is greater than the first capacity of the resource of the network.

15. The method of claim 13, wherein enablement of the exceeding of the first capacity of the resource of the network prior to the exceeding was further based on a prediction of future usage, by the user device, of the resource of the network.

16. The method of claim 13, wherein enablement of the exceeding of the first capacity of the resource of the network prior to the exceeding was further based on a data store comprised of historical information associated with usage of the user device.

17. The method of claim 13, wherein the network slice was previously assigned to support the network slice based on a service level agreement specifying a guideline for assigning the first capacity of the resource of the network and for the monitoring of the using of the network slice, and wherein enablement of the exceeding of the first capacity of the resource of the network prior to the exceeding was in accordance with the service level agreement.

18. A non-transitory machine-readable medium, comprising executable instructions that, when executed by a processor of an assigning device, facilitate performance of operations, comprising:
   analyzing a resource of a network device assigned to support a network slice, resulting in a discovered configuration applicable to the network slice, wherein the discovered configuration was allocated to a user device via a network, based on a characteristic of the user device and a network service to be used by the user device, wherein a capacity of a resource of the network accessible via network devices of the network was previously assigned to support the network slice based on the discovered configuration, and wherein the resource comprises a first backhaul network connection to edge network equipment that supports operation of the network slice;
   based on the discovered configuration, monitoring usage of the first backhaul connection by the network slice based on activity of the user device resulting in monitored resource usage of the network slice;
   based on the monitored resource usage, identifying a change in the capacity of the resource to maintain support of the network service at a threshold quality of service, resulting in an identified change; and
   based on the identified change, assigning, during the usage of the resource, additional capacity for the resource of the network based on and during the monitored resource usage of the network slice and a data structure of historical information associated with the network, wherein the additional capacity is enabled at least in part using a second backhaul connection to the edge network equipment.

19. The non-transitory machine-readable medium of claim 18, wherein assigning the additional capacity for the resource of the network was further based on a prediction of future usage by the user device, of the resource of the network.

20. The non-transitory machine-readable medium of claim 19, wherein the data structure was configured to facilitate analysis based on machine learning, and wherein the operations further comprise generating the prediction of future usage based on a machine learning regression analysis of the historical information.

\* \* \* \* \*